Jan. 5, 1960  G. R. ASCHAUER  2,919,778
HYDRAULICALLY OPERATED, MULTIPLE CLUTCH
Filed Aug. 11, 1955  3 Sheets-Sheet 2
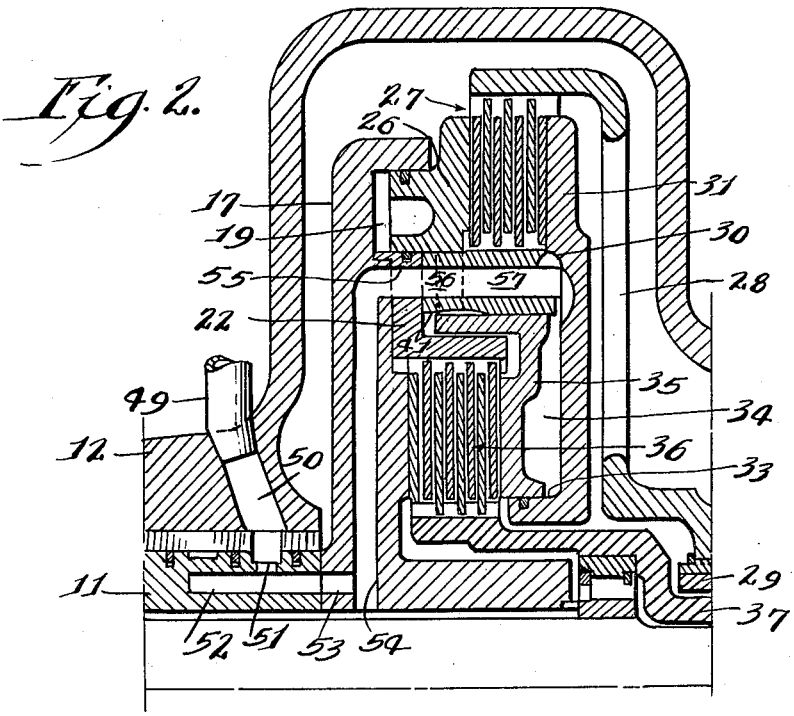
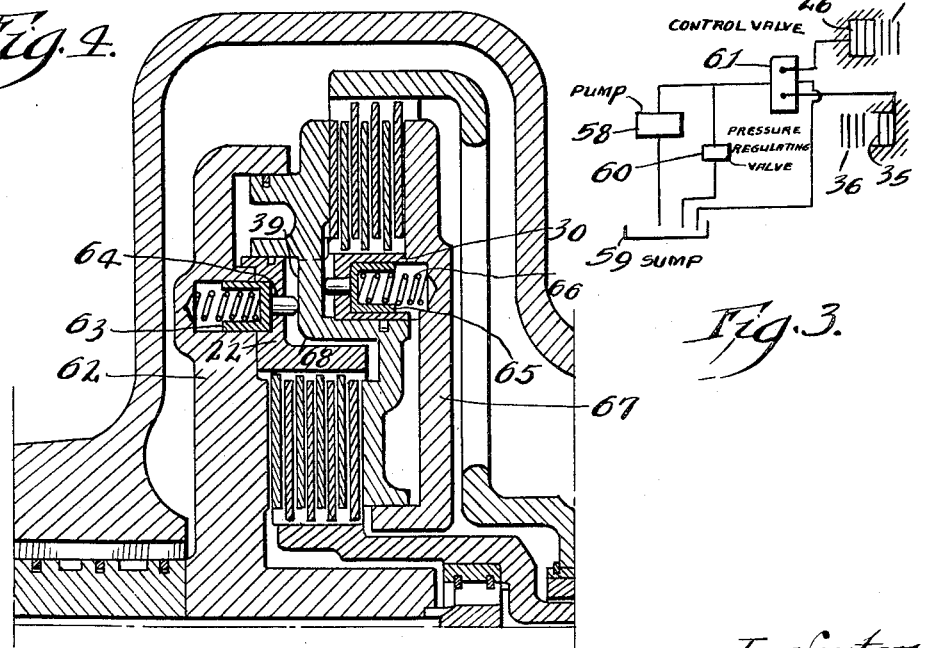
Inventor:
George R. Aschauer,
By. [signature]
Attorney.

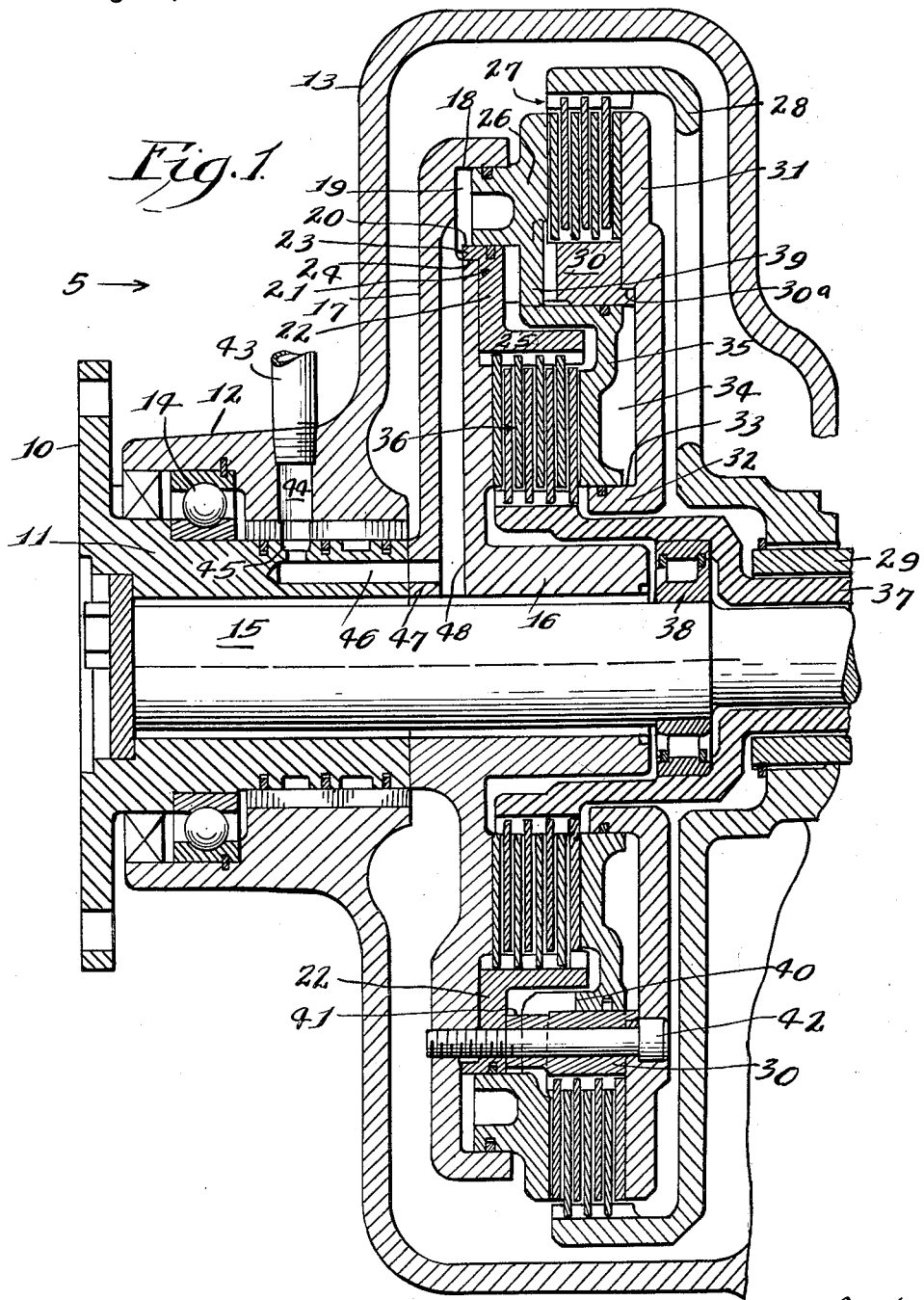

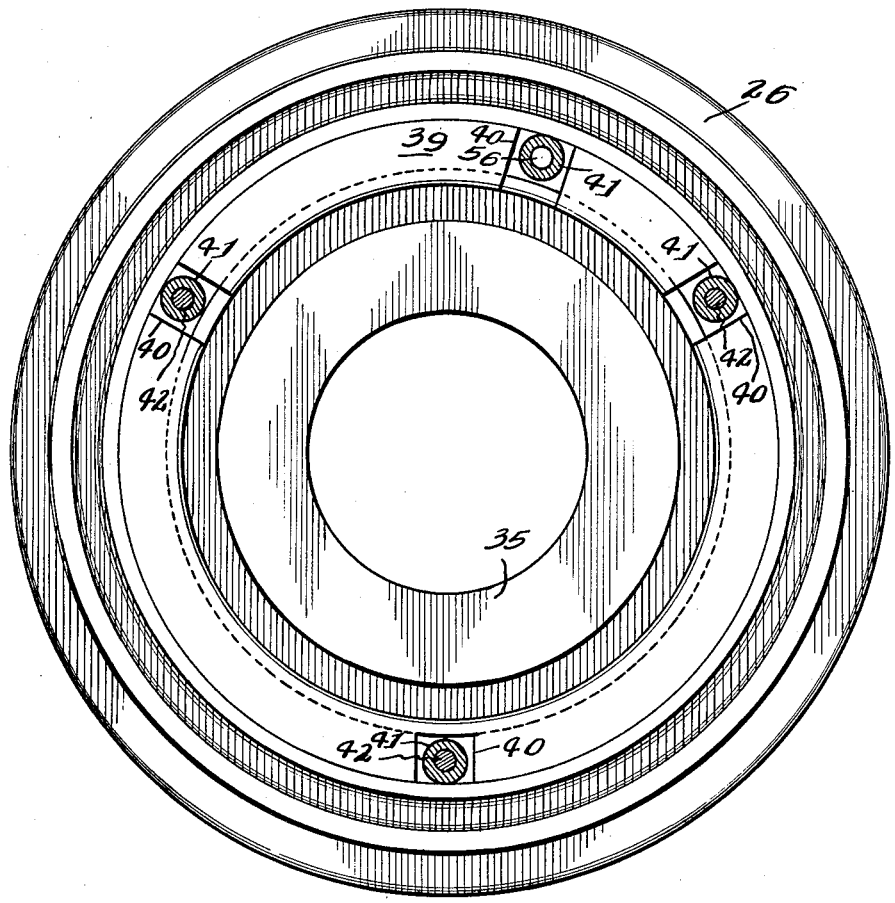

United States Patent Office
2,919,778
Patented Jan. 5, 1960

2,919,778

HYDRAULICALLY OPERATED, MULTIPLE CLUTCH

George R. Aschauer, Racine, Wis., assignor to Twin Disc Clutch Company, Racine, Wis., a corporation of Wisconsin Application August 11, 1955, Serial No. 527,706

9 Claims. (Cl. 192—86)

My invention relates to hydraulically operated, multiple clutches in which the clutching elements are selectively operable to transmit power under desired conditions and characterized by a minimum of axial length.

One object of the invention is to provide a dual clutch structure in which the clutches are hydraulically actuated and concentrically related in radially inward and outward positions, respectively.

A further object is to provide a structure of the character indicated which includes connected concentric and clutch engaging pistons responsive to the actuating medium and area conditioned to insure complete hydraulic balance at all speeds and axial positions of the pistons.

A further object is to provide a friction clutch device including a pair of hydraulically actuated, concentric clutches in which the fluid responsive and friction elements are substantially nested to markedly reduce the axial length of the device.

These and further objects of the invention will be set forth in the following specification, reference being had to the accompanying drawings, and the novel means by which the objects are effectuated will be definitely pointed out in the claims.

In the drawings:

Fig. 1 is a sectional elevation of the device with the clutches in release positions, the section being taken along a diameter showing the liquid pressure connection to the outer clutch.

Fig. 2 is a fragmentary section along a different diameter of the device showing the liquid pressure connection to the inner clutch.

Fig. 3 is a schematic layout showing a suggested hydraulic circuit for the clutches.

Fig. 4 is a modified, fragmentary section along another diameter of the device showing a suggested spring loading for assisting in centering the pistons in neutral positions.

Fig. 5 is an axial view of the connected pistons looking in the direction of the arrow 5 in Fig. 1, certain parts which extend through the connector for the pistons being shown in section.

Referring to Fig. 1, the numeral 10 designates an input flange connectible to any source of power and forming part of a hub 11 that is positioned within a cylindrical extension 12 projecting from an annular housing 13 and is journaled in a bearing 14 carried by such extension. The hub 11 is keyed or splined to a shaft 15 and its inner end abuts a hub 16 which drivingly connects with the shaft and includes a disk 17 located adjacent the abutting portions of the hubs 11 and 16.

The outer part of the disk 17 is counterbored to provide an annular wall 18 which constitutes the outer wall of an annular cylinder 19 whose inner wall 20 is defined by the outer surface of an annulus 21. The latter is generally of L-section including a radial limb 22 which abuts the adjacent surface of the disk 17 and has an annular lip 23 which slips over an annular shoulder 24 provided on the disk 17, and an annular limb 25 which is coaxial with the shaft 15. The annular, inner surface of the limb 25 is appropriately toothed for driving engagement with a plurality of friction clutch plates presently described.

Slidably mounted in and having suitable sealing relation to the cylinder 19 is an annular piston 26 which is operably related to an annular friction clutch 27, alternate plates of the clutch having toothed connection in the usual manner with an annular, output connector 28 whose inward portion is keyed to an output sleeve 29 that is coaxial with the shaft 15. The intervening plates of the clutch 27 have toothed engagement in the usual manner with an annulus 30, also coaxial with the shaft 15, and radially positioned so that a substantial part thereof lies generally opposite and in axially spaced relation to the limb 22 of the annulus 21. The annulus 30 is shouldered at 30ᵃ to partially support an annular back plate 31.

The plates of the clutch 27 are gripped by the piston 26 against the back plate 31 which also abuts the adjacent side of the member 30 and the radially inner part includes an annular shell 32 which is coaxial with the shaft 15 and extends towards the disk 17. The outer wall 33 of the shell 32 constitutes the inner wall of an annular cylinder 34 whose outer wall is defined by the inner, annular surface of the annulus 30. Slidable in the cylinder 34 and sealably related thereto is an annular piston 35 which is operably related to an annular friction clutch 36, alternate plates thereof having toothed connection with the annular limb 25 while the intervening plates have like connection with an output sleeve 37 intermediately journaled on a bearing 38 which encircles the shaft 15. The friction plate connecting portion of the sleeve 37 lies inwardly of the clutch 36 and extends between the disk hub 16 and the shell 32 in spaced relation to both of these parts. The plates of the clutch 36 are gripped by the piston 35 against the adjacent portion of the disk 17 which acts as a back plate.

The pistons 26 and 35 are tied together for simultaneous movement by a radial connector 39 which extends between the radial limb 22 and the annulus 30. As shown in the lower portion of Fig. 1, the connector 39 is apertured in spaced, circumferential locations as at 40, only one such aperture being shown, and projecting through each aperture in a boss 41 which forms an extending part of the annulus 30 and abuts the radial limb 22. A plurality of circumferentially spaced cap screws 42 are bridged between the disk 17 and back plate 31 and extend through the annulus 30, certain of the bosses 41 and the radial limb 22, thus locking these parts together for rotation.

Oil pressure for the outer cylinder 19 is supplied through a pipe 43 whose delivery end connects with a radial passage 44 in the housing extension 12 which in turn connects successively through an annular channel 45 in the hub 11, aligned, longitudinal passages 46 and 47 in the hub 11 and disk 17, respectively, and radial passage 48 in this disk. Similarly, oil pressure for the inner cylinder 34 (see Fig. 2) is supplied through a pipe 49 whose delivery end connects with an inwardly extending passage 50, also in the housing extension 12 but longitudinally spaced from the passage 44. The passage 50 in turn connects successively through an annular channel 51 in the hub 11, aligned, longitudinal passages 52 and 53 in the hub 11 and disk 17, respectively, radial passage 54 in this disk, and aligned, longitudinal passages 55, 56 and 57 in the radial limb 22, a boss 41 and annulus 30, the delivery end of the passage 54 bending to register with the passage 55 and the back plate 31 being suitably relieved to provide communication between the delivery end of the passage 57 and the cylinder 34.

Preferably, the cylinders 19 and 34 are maintained in a filled condition to compensate for leakage and promote quicker engaging action and in the neutral positions shown in Fig. 1, the filling may be under a small pressure such as about five p.s.i. A suggested arrangement is shown in Fig. 3 wherein a suitable pump 58 draws the oil from a sump 59 under the control of a pressure regulating valve 60 which is bridged around the pump and the discharge of the latter is delivered to a control valve 61. This valve selectively determines the engagement of either clutch and their neutral positions as well as maintaining the filling of the cylinders 19 and 34 at any desired pressure in the latter positions. When one piston is moved to engaging position, the other piston is simultaneously moved to disengaging position. There are many types of control valves for accomplishing the above, the valve per se not forming any part of the invention. A suggested valve is shown in United States Letters Patent No. 2,464,538, dated March 15, 1949.

A particular advantage of the foregoing construction is the hydraulic balancing of the connected pistons 26 and 35 in any axial position by the opposing thrusts of the oil fills in the cylinders. This arrangement has special value in high speed clutches since there is no tendency for either piston to shift from neutral to engaged position due to centrifugal force acting on the oil in the associated cylinder. To achieve this result and as shown in Fig. 1, the area of the inner piston 35 that is exposed to the oil fill is substantially larger than the like area of the outer piston 26.

This relationship is determined by ascertaining the force acting axially due to centrifugal force according to the following, experimentally derived equation and which forces acting on the respective pistons are equal:

$$F = KWN^2[R_0^4 - 2R_E^2(R_0^2 + R_1^2) - R_1^4]$$

in which $K = 12.9 \ (10^{-9})$
$W$ = weight of actuating oil, lbs./cu. ft.
$N$ = r.p.m.

Considering the outer clutch 27, the remaining factors of the equation are defined as follows:

$R_0$ = radius in inches of wall 18
$R_1$ = radius in inches of wall 20
$R_E$ = radius in inches of inlet end of passage 48

For the inner clutch, the "R" factors are as follows:

$R_0$ = radius in inches of inner wall of member 30
$R_1$ = radius in inches of wall 33
$R_E$ = radius in inches of that part of passage 54 which is equal to $R_1$ The concentric, radially inward and outward relation of the clutches materially reduces the axial length of the structure compared to dual clutches in which the clutches are oppositely related and axially aligned. Compactness in an axial direction is further assured by the generally nested or telescoped relation of the components as clearly shown in Fig. 1 whereby some of the engaging parts of the respective clutches are substantially coplanarly related. The disk 17 and the annular member 21 which is at least partially supported thereon in effect constitute one part which includes the outer cylinder 19 and the back plate for the inner clutch 36, while the back plate 31 and the annular member 30 which is at least partially supported thereon in effect constitute a second part which includes the back plate for the outer clutch 27 and the inner cylinder 34.

In Fig. 4 is shown a suggested arrangement for assisting in centering the pistons when the clutches are in neutral position. Briefly, the disk 62, corresponding to the disk 17, is recessed in convenient circumferential locations to receive a plurality of spring actuated plungers 63 which in their extended positions seat in pockets provided on one side of the limb 22, each plunger carrying a finger 64 slidably through this limb and constantly abutting the adjacent side of the connector 39. Further, the annulus 30 is recessed in convenient circumferential locations to receive a plurality of spring actuated plungers 65 which in their extended positions seat on the annulus 30, each plunger spring 66 seating at one end against the back plate 67, corresponding to the back plate 31. Each plunger 65 carries a finger 68 which constantly abuts the opposite side of the connector 39.

From the foregoing, it will be understood that there is a limit to the extending movement of the plungers 63 and 65 and this limit is such that neither plunger can move its associated piston beyond its neutral position.

I claim:

1. In clutch construction, the combination of an input annular member recessed to provide an outer annular cylinder, a second annular member axially spaced from the input member and recessed to provide an inner, annular cylinder, means tying the members for rotation together, an hydraulically actuated piston mounted in each cylinder, outer and inner friction clutches respectively mounted between the outer piston and the second member as a back plate and between the inner piston and the input member as a back plate, and means connecting the pistons for simultaneous movement and shaped to provide a substantially nested relation of the clutches between the input and second members.

2. In clutch construction, the combination of an input annular member recessed to provide an outer annular cylinder, a second annular member axially spaced from input member and recessed to provide an inner, annular cylinder, means tying the members for rotation together, an hydraulically actuated piston mounted in each cylinder, outer and inner friction clutches respectively mounted between the outer piston and the second member as a back plate and between the inner piston and the input member as a back plate and arranged so that parts of one clutch are in substantially coplanar relation to parts of the other clutch, and means connecting the pistons for simultaneous movement and shaped to provide a substantially nested relation of the clutches between the input and second members.

3. In clutch construction, the combination of a pair of concentric, selectively engageable, radially outer and inner, friction clutches, radially outer and inner, hydraulically actuated means for engaging the clutches, respectively, each of said means including a cylinder and a piston mounted therein, means for respectively determining a filling of each cylinder with the actuating liquid in any position of the associated piston and the engaging pressure in a selected cylinder and including a liquid passage extending inwardly from each cylinder, the pistons being connected for simultaneous movement and having their liquid exposed ends relatively sized to equalize the thrust F of the liquid on the respective pistons due to centrifugal force in accordance with the formula for each cylinder:

$$F = KWN^2[R_0^4 - 2R_E^2(R_0^2 + R_1^2) - R_1^4]$$

in which $K = 12.9 \ (10^{-9})$
$W$ = Weight of liquid, lbs./cu. ft.
$N$ = r.p.m.

for the outer cylinder $R_0$ and $R_1$ = radii in inches of outer and inner, annular walls, respectively
$R_E$ = radius in inches of inner end of passage to outer cylinder for the inner cylinder $R_0$ and $R_1$ = radii in inches of outer and inner, annular walls, respectively
$R_E$ = radius in inches of that part of passage to inner cylinder which equals $R_1$ 4. A clutch construction as defined in claim 3 wherein the liquid exposed end of the inner piston has a substantially greater area than the corresponding area of the outer piston.

5. A clutch construction as defined in claim 3 wherein the clutches are related to place some friction parts of one clutch in coplanar relation to some friction parts of the other clutch.

6. A clutch construction as defined in claim 3 wherein means is provided to connect the pistons for simultaneous movement and spring actuated means are positioned on opposite sides, respectively, of the connecting means and engageable therewith for assisting in maintaining the pistons in neutral positions, each spring actuated means having a finger constantly bearing against the adjacent side of the connecting means.

7. In hydraulic clutch construction, the combination of an input annular member recessed to provide an outer annular cylinder, a second annular member axially spaced from the input member and recessed to provide an inner annular cylinder, the cylinders being constantly filled with actuating liquid, a passage extending inwardly from each cylinder for supplying the liquid thereto, means tying the members for rotation together, an hydraulically actuated piston mounted in each cylinder, outer and inner friction clutches respectively mounted between the outer piston and the second member as a back plate and between the inner piston and the input member as a back plate, and means connecting the pistons for simultaneous movement and shaped to provide a substantially nested relation of the clutches between the input and second members, the liquid exposed ends of the pistons being relatively sized to equalize the thrust F of the liquid on the respective pistons due to centrifugal force in accordance with the formula for each cylinder:

$$F = KWN^2[R_0^4 - 2R_E^2(R_0^2 + R_1^2) - R_1^4]$$

8. An hydraulic clutch construction as defined in claim 7 wherein the liquid exposed end of the inner piston has a substantially greater area than the corresponding area of the outer piston.

9. An hydraulic clutch construction as defined in claim 7 wherein the clutches are related to place some of the friction parts of one clutch in coplanar relation to some friction parts of the other clutch.

References Cited in the file of this patent

UNITED STATES PATENTS

| | | |
|---|---|---|
| 2,234,693 | Frink | Mar. 11, 1941 |
| 2,286,873 | Schwartz | June 16, 1942 |
| 2,399,853 | Chilton | Mar. 7, 1946 |
| 2,437,430 | Lawrence | Mar. 9, 1948 |
| 2,464,538 | Vanderzee | Mar. 15, 1949 |
| 2,753,729 | Main | July 10, 1956 |